United States Patent
Mhetar

(10) Patent No.: US 6,355,766 B1
(45) Date of Patent: Mar. 12, 2002

(54) POLYCARBONATE COMPOSITIONS FOR DATA STORAGE MEDIA

(75) Inventor: Vijay R. Mhetar, Pittsfield, MA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/561,209

(22) Filed: Apr. 28, 2000

(51) Int. Cl.$^7$ .............................................. C08G 64/00
(52) U.S. Cl. ...................................... 528/196; 528/198
(58) Field of Search .................................. 528/196, 198

(56) References Cited

U.S. PATENT DOCUMENTS

| 4,081,495 A | 3/1978 | Freitag et al. | 264/338 |
| 4,217,438 A | 8/1980 | Brunelle et al. | 528/202 |
| 5,726,228 A | 3/1998 | Kaufmann et al. | 524/108 |

FOREIGN PATENT DOCUMENTS

| JP | 1986-210907 | * | 9/1986 |
| JP | 11001608 | | 1/1999 |
| JP | 11035671 | | 2/1999 |
| JP | 11049945 | * | 2/1999 |
| JP | 11273146 | * | 10/1999 |
| WO | WO9939888 | | 8/1999 |

OTHER PUBLICATIONS

"The Effects of Thermal Pre–Treatment and Molecular Weight on the Impact Behaviour of Polycarbonate", G.L. Pitman, I.M. Ward, R.A. Duckett, *Journal of Materials Science* 13 (1978) pp. 2092–2104.

"Effects of Molecular Weight and Strain Rate on the Flexural Properties of Polycarbonate", J.H. Golden, B.L. Hammant, and E.A. Hazell, *Journal of Applied Polymer Science*, vol. 12, pp. 557–569 (1968).

"Mechanical Properties of Polymers: The Influence of Molecular Weight and Molecular Weight Distribution", John R. Martin, Julian F. Johnson and Anthony R. Cooper, *J. Macromol. Sci.–Revs. Macromol. Chem.*, (C8(*1*), pp. 57–199 (1972).

* cited by examiner

Primary Examiner—Terressa M. Boykin

(57) ABSTRACT

A polycarbonate composition comprising polycarbonate resins with different weight average molecular weights produces a synergy improving both energy and flow. This composition comprises: about 50 to about 96 pbw of a first polycarbonate resin having a $M_w$ of about 14,000 to about 40,000; about 4 pbw to about 30 pbw of a second polycarbonate resin having a $M_w$ of about 1,000 to about 10,000; and up to about 20 pbw of a third polycarbonate resin having a $M_w$ of greater than about 23,000. This material can be used in numerous applications, including, for example, data storage media.

39 Claims, No Drawings

POLYCARBONATE COMPOSITIONS FOR DATA STORAGE MEDIA

TECHNICAL FIELD

The present invention relates to polycarbonate compositions, and especially relates to polycarbonate compositions for use in data storage media.

BACKGROUND OF THE INVENTION

Optical, magnetic and magneto-optic media are primary sources of high performance storage technology which enables high storage capacity coupled with a reasonable price per megabyte of storage. Areal density, typically expressed as billions of bits per square inch of disk surface area (gigabits per square inch ($Gbits/in^2$)), is equivalent to the linear density (bits of information per inch of track) multiplied by the track density in tracks per inch. Improved areal density has been one of the key factors in the price reduction per megabyte, and further increases in areal density continue to be demanded by the industry.

In the area of optical storage, advances focus on access time, system volume, and competitive costing. Increasing areal density is being addressed by focusing on the diffraction limits of optics (using near-field optics), investigating three dimensional storage, investigating potential holographic recording methods and other techniques.

Polycarbonate data storage media has been employed in areas such as compact disks (CD) and recordable compact discs (e.g., CD-RW), and similar relatively low areal density devices, e.g. less than about 1 $Gbits/in^2$, which are typically read-through devices requiring the employment of a good optical quality substrate having low birefringence, heat resistance, and moldability. Next generation storage media, however, are anticipated to possess more stringent specifications and tolerances on pit/groove replication, birefringence, and dimensional stability.

What is needed in the art are advances in polycarbonate compositions and/or moldabiltiy to birefringence, dimensional stability, and replications.

BRIEF SUMMARY OF THE INVENTION

The present invention relates to a polycarbonate composition and a data storage media using the same. The polycarbonate composition comprises, based upon 100 pbw: about 50 to about 96 pbw of polycarbonate resin (A) having a weight average molecular weight ($M_w$) of about 14,000 atomic mass units (AMU) to about 40,000 AMU; about 4 pbw to about 30 pbw of polycarbonate resin (B) having a $M_w$ of about 1,000 AMU to about 10,000 AMU; and 0 to about 20 pbw of polycarbonate resin (C) having a $M_w$ of greater than about 23,000 AMU.

The data storage media comprises: a polycarbonate substrate comprising, based upon 100 pbw: about 50 to about 96 pbw of polycarbonate resin (A) having a $M_w$ of about 12,000 AMU to about 40,000 AMU, about 4 pbw to about 30 pbw of polycarbonate resin (B) having a $M_w$ of about 1,000 AMU to about 14,000 AMU; and about 0 to about 20 pbw of polycarbonate resin (C) having a $M_w$ of greater than about 23,000 AMU; and a data storage layer disposed on at least one side of said substrate.

DETAILED DESCRIPTION OF THE INVENTION

The present invention relates to a polycarbonate composition and a storage media substrate comprising the same.

The polycarbonate composition comprises, based upon 100 parts by weight (pbw): about 50 to about 96 pbw polycarbonate resin (A), with about 75 to about 96 pbw preferred, and about 84 to about 92 pbw most preferred, wherein polycarbonate resin (A) has a weight average molecular weight ($M_w$) of about 12,000 AMU to about 40,000 AMU, with about 14,000 AMU to about 20,000 AMU preferred; about 4 pbw to about 30 pbw of polycarbonate resin (B), with about 4 to about 15 pbw preferred, and about 8 pbw to about 12 pbw especially preferred, wherein polycarbonate resin (B) has a $M_w$ of about 1,000 AMU to about 14,000 AMU, with about 5,000 AMU to about 10,000 AMU preferred; and 0 to about 20 pbw of polycarbonate resin (C), with about 0.05 to about 10 pbw preferred, and about 0.1 to about 4 pbw especially preferred, wherein polycarbonate resin (C) has a $M_w$ of greater than about 23,000 AMU, with about 23,000 AMU to about 125,000 AMU preferred.

As used herein, the terms "polycarbonate", "polycarbonate composition", and "composition comprising aromatic carbonate chain units" includes compositions having structural units of the formula (I):

(I)

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

(II)

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative, non-limiting examples of radicals of this type are —O—, —S—, —S(O)—, —S($O_2$)—, —C(O)—, methylene, cyclohexylmethylene, 2-[2,2,1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

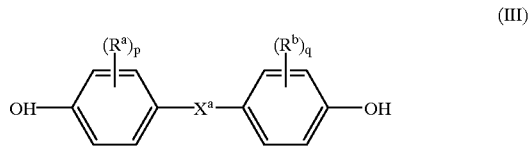
(III)

wherein $R^a$ and $R^b$ each represent a halogen atom or a monovalent hydrocarbon group and may be the same or different; p and q are each independently integers from 0 to 4; and $X^a$ represents one of the groups of formula (IV):

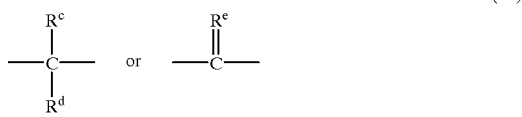

(IV)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (III) includes the following: 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl) phenylmethane; 2,2-bis(4 -hydroxy-1-methylphenyl) propane; 1,1-bis(4-hydroxy-t-butylphenyl)propane; bis (hydroxyaryl)alkanes such as 2,2-bis(4-hydroxy-3-bromophenyl)propane; 1,1-bis(4-hydroxyphenyl) cyclopentane; and bis(hydroxyaryl)cycloalkanes such as 1,1-bis(4-hydroxyphenyl)cyclohexane; and the like as well as combinations comprising at least one of the foregoing. Preferred polycarbonates are based on bisphenol A, in which each of $A^1$ and $A^2$ is p-phenylene and $Y^1$ is isopropylidene.

In addition to the polycarbonate, the composition may optionally include various additives ordinarily incorporated in resin compositions of this type. Such additives may include antioxidants, heat stabilizers, antistatic agents, mold releasing agents (pentaerythritol tetrastearate; glycerol monstearate, and the like), and the like, and combinations comprising at least one of the foregoing. For example, about 0.01 to about 0.1 pbw of a heat stabilizer; about 0.01 to about 0.2 pbw of an antistatic agent; about 0.1 to about 1 pbw of a mold releasing agent. The above amounts of the additives are based on 100 pbw of the polycarbonate resin.

Some possible antioxidants include, for example, organophosphites, for example, tris(nonyl-phenyl) phosphite, tris(2,4-di-t-butylphenyl)phosphite, bis(2,4-di-t-butylphenyl)pentaerythritol diphosphite, distearyl pentaerythritol diphosphite and the like; alkylated monophenols, polyphenols and alkylated reaction products of polyphenols with dienes, such as, for example, tetrakis [methylene(3,5-di-tert-butyl-4-hydroxyhydrocinnamate)] methane, 3,5-di-tert-butyl-4-hydroxyhydrocinnamate octadecyl, 2,4-di-tert-butylphenyl phosphite, and the like; butylated reaction products of para-cresol and dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds, such as, for example, distearylthiopropionate, dilaurylthiopropionate, ditridecylthiodipropionate, and the like; amides of beta-(3, 5-di-tert-butyl4-hydroxyphenyl)-propionic acid; and the like, as well as combinations comprising at least one of the foregoing.

Other potential additives which may be employed comprise: UV absorbers; stabilizers such as light and thermal stabilizers (e.g., acidic phosphorous-based compounds); hindered phenols; zinc oxide and/or zinc sulfide particles; lubricants (mineral oil, and the like), plasticizers, dyes (quinines, azobenzenes, and the like);; anti-static agents (tetra alkylammonium benzene sulfonate salts, tetra alkylphosphonium benzene sulfonate salts, and the like); among others, as well as combinations comprising at least one of the foregoing.

Data storage media using this polycarbonate composition can be produced by first forming the polycarbonate composition using a conventional reaction vessel capable of adequately mixing the various components, such as a single or twin screw extruder, kneader, or the like. The components can either be premixed (e.g., in a pellet or powder form) and simultaneously fed through a hopper into the extruder, two of the different $M_w$ polycarbonates can be introduced to the extruder and melted prior to the addition of the third $M_w$ polycarbonate, or they can be fed individually where the first $M_w$ polycarbonate resin introduced is melted before the introductions of another $M_w$ polycarbonate resin. The extruder should be maintained at a sufficiently high temperature to melt the polycarbonates without causing decomposition thereof. Temperatures of about 220° C. to about 360° C. can be used, with about 260° C. to about 320° C. preferred. Similarly, the residence time in the extruder should be controlled to minimize decomposition. Residence times of up to about 2 minutes (min) or more can be employed, with up to about 1.5 min preferred, and up to about 1 min especially preferred.

Prior to extrusion into the desired form (typically pellets, sheet, web, or the like) the mixture can optionally be filtered, such as by melt filtering and/or the use of a screen pack, or the like, to remove undesirable contaminants or decomposition products.

Once the polycarbonate composition has been produced, it can be formed into the data storage media, or any other desired article (films, lenses, sheets, etc.) using various molding and processing techniques. Possible molding techniques include injection molding, film casting, extrusion, press molding, blow molding, and the like. If the composition is employed as a data storage media, for example, additional processing such as electroplating, coating techniques (spin coating, spray coating, vapor deposition, screen printing, painting, dipping, and the like), lamination, sputtering, and combinations comprising at least one of the foregoing, among others conventionally known in the art, may be employed to dispose desired layers on the polycarbonate substrate.

An example of a polycarbonate data storage media comprises an injection molded polycarbonate substrate which may optionally comprise a hollow (bubbles, cavity, and the like) or filled (metal, plastics, glass, ceramic, etc., in various forms such as fibers, spheres, etc.) core. Disposed on the substrate are various layers including: a data layer, dielectric layer(s), a reflective layer, and/or a protective layer. These layers comprise conventional materials and are disposed in accordance with the type of media produced. For example, for a first surface media, the layers may be protective layer, dielectric layer, data storage layer, dielectric layer, and then the reflective layer disposed in contact with the substrate, while for an optical media the layers may be protective layer, reflective layer, dielectric layer, and data storage layer, with a subsequent dielectric layer in contact with the substrate.

The data storage layer(s) may comprise any material capable of storing retrievable data, such as an optical layer, magnetic layer, or a magneto-optic layer, having a thickness of up to about 600 Å, with a thickness up to about 300 Å preferred. Possible data storage layers include, but are not limited to, oxides (such as silicone oxide), rare earth element—transition metal alloy, nickel, cobalt, chromium, tantalum, platinum, terbium, gadolinium, iron, boron, others, and alloys and combinations comprising at least one of the foregoing, organic dye (e.g., cyanine or phthalocyanine type dyes), and inorganic phase change compounds (e.g., TeSeSn or InAgSb).

The protective layer(s), which protect against dust, oils, and other contaminants, can have a thickness of greater than about 100μ to less than about 10 Å, with a thickness of about 300 Å or less preferred in some embodiments, and a thickness of about 100 Å or less especially preferred. The thickness of the protective layer(s) is usually determined, at least in part, by the type of read/write mechanism employed, e.g., magnetic, optic, or magneto-optic. Possible protective layers include anti-corrosive materials such as nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, etc.), among others, and combinations comprising at least one of the foregoing.

The dielectric layer(s), which are disposed on one or both sides of the data storage layer and are often employed as heat controllers, can typically have a thickness of up to or exceeding about 1,000 Å and as low as about 200 Å. Possible dielectric layers include nitrides (e.g., silicon nitride, aluminum nitride, and others); oxides (e.g., aluminum oxide); carbides (e.g., silicon carbide); and combinations comprising at least one of the foregoing, among other materials compatible within the environment and preferably, not reactive with the surrounding layers.

The reflective layer(s) should have a sufficient thickness to reflect a sufficient amount of energy to enable data retrieval. Typically the reflective layer(s) can have a thickness of up to about 700 Å, with a thickness of about 300 Å to about 600 Å generally preferred. Possible reflective layers include any material capable of reflecting the particular energy field, including metals (e.g., aluminum, silver, gold, titanium, and alloys and mixtures comprising at least one of the foregoing, and others). In addition to the data storage layer(s), dielectric layer(s), protective layer(s) and reflective layer(s), other layers can be employed such as lubrication layer and others. Useful lubricants include fluoro compounds, especially fluoro oils and greases, and the like.

The following examples are provided to further illustrate the present invention and not to limit the scope hereof.

EXAMPLES

Individual components of the ternary polycarbonate blends were analyzed by Gel Permeation Chromatography (using polycarbonate standards), and the ternary blends were analyzed by Melt Flow Rate (MFR), and Dynamic Mechanical Analysis (DMA). Optical disk substrates (diameter=120 millimeters (mm), thickness 1.2 mm) were injection molded using the above mentioned polycarbonate compositions. The processability of the polycarbonate compositions is measured in terms of the MFR of the resin and the peak pressure observed during the injection phase of the molding operation.

The ductility of the molded substrates was measured in terms of energy absorbed during compression-bending in a specially designed jigs. A disk was placed between the jigs that are initially 105 mm apart. The lower jig was moved upwards at 500 mm/min and the energy expended to bend the disk was monitored. The maximal stroke was 95 mm.

Quality of the signal produced by the disk is related to the extent of replication that is achieved onto it during molding compared to the stamper used. Replication of pits onto the molded disks was determined by measuring the depth of the pits by using Atomic Force Microscope (AFM). It was reported as a percentage of the depth of the pit on the stamper.

Table 1 shows MFR, energy and replication data for a few representative blends of polycarbonates A, B, and C.

TABLE 1

| Material | Composition | | | | | | |
|---|---|---|---|---|---|---|---|
| | 1 | 2 | 3 | 4 | 5 | 6 | 7 |
| A ($M_w$ – 18,242) (pbw) | 100 | 94 | 90 | 96 | 94 | 86 | 84 |
| B ($M_w$ – 8,693) (pbw) | 0 | 6 | 10 | 0 | 0 | 10 | 10 |
| C ($M_w$ – 24,328) (pbw) | 0 | 0 | 0 | 4 | 6 | 4 | 6 |
| Property | | | | | | | |
| MFR (cc/10 min) | 12.3 | 15.1 | 17.3 | 11.5 | 11.3 | 15.8 | 15.6 |
| Energy (N · m) | 4.7 | 4.5 | 3 | 5.4 | 5.4 | 5.4 | 5.6 |
| Replication (%) | 65 | 77 | 89 | 59 | 56 | 79 | 78 |

Binary blends of A and B (compositions 2 and 3) showed increase in MFR but decrease in energy values; on the other hand binary blends of A and C (compositions 4 and 5) showed decrease in MFR and improvement in energy. However, simultaneous improvement in both flow and ductility was achieved for ternary blends of A, B and C (compositions 6 and 7). Notice that the magnitude of replication was also increased with increase in flow.

Additional data is for two other ternary systems is reported in Table 2. It can be seen that there exists a wide composition space in which flow of the resin can be increased significantly without the loss of ductility. Naturally, the improvements in processability of the resin result in higher percentage replication as shown in Table 2.

TABLE 2

| Material | Composition | | | | | | |
|---|---|---|---|---|---|---|---|
| | 8 | 9 | 10 | 11 | 12 | 13 | 14 |
| A ($M_w$ – 18,242) (pbw) | 100 | 90 | 88 | 88 | 90 | 88 | 86 |
| B ($M_w$ – 8,693) (pbw) | 0 | 8 | 8 | 9 | 8 | 8 | 10 |
| C ($M_w$ – 24,328) (pbw) | 0 | 2 | 4 | 3 | 0 | 0 | 0 |
| D ($M_w$ – 28,563) (pbw) | 0 | 0 | 0 | 0 | 2 | 4 | 4 |
| Property | | | | | | | |
| MFR (cc/10 min) | 12.7 | 16.1 | 15.8 | 16.2 | 17.1 | 16.3 | 15.7 |
| Energy (N · m) | 5.0 | 5.1 | 5.2 | 5.0 | 5.0 | 5.3 | 5.4 |
| Replication (%) | 69 | 81 | 80 | 83 | 86 | 82 | 81 |

As can be seen from Tables 1 and 2, the ternary polycarbonate composition unexpectedly produces a material having both improved flow and ductility. In contrast, binary compositions resulted in either a reduction in flow or ductility. While intuitively, from the results of Compositions 2 through 5 and conventional wisdom, the formation of a ternary blend would have been expected to negatively impact flow and/or ductility, unexpected synergy resulted in improved flow and ductility. Moreover, improved flow of the composition resulted in higher % replication leading to better signal performance without the loss of ductility.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A polycarbonate composition based upon 100 pbw, comprising:
    about 50 to about 96 pbw of polycarbonate resin (A) having a weight average molecular weight of about 12,000 AMU to about 40,000 AMU;
    about 4 pbw to about 30 pbw of polycarbonate resin (B) having a weight average molecular weight of about 1,000 AMU to about 14,000 AMU; and
    about 0.05 to about 20 pbw of polycarbonate resin (C) having a weight average molecular weight of greater than about 23,000 AMU;
    wherein all molecular weights are determined by gel permeation chromatography using polycarbonate standards.

2. The polycarbonate composition of claim 1, wherein said polycarbonate resin (A), said polycarbonate resin (B), and said polycarbonate resin (C) have structural units of the formula (I):

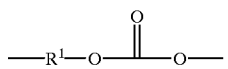

(I)

where $R^1$ is an aromatic organic radical.

3. The polycarbonate composition of claim 2, wherein said $R^1$ is a radical of the formula (II):

(II)

wherein each of the $A^1$ and the $A^2$ is a monocyclic divalent aryl radical, and $Y^1$ is a bridging radical having one or two atoms which separate the $A^1$ from the $A^2$.

4. The polycarbonate composition of claim 3, wherein the $Y^1$ is selected from the group consisting of —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene.

5. The polycarbonate composition of claim 1, wherein the weight average molecular weight of said polycarbonate resin (A) is about 14,000 AMU to about 20,000 AMU, the weight average molecular weight of said polycarbonate resin (B) is about 5,000 AMU to about 10,000 AMU, and the weight average molecular weight of said polycarbonate resin (C) is about 23,000 AMU to about 125,000 AMU.

6. The polycarbonate composition of claim 5, comprising about 75 pbw to about 96 pbw of said polycarbonate resin (A), and about 4 pbw to about 15 pbw of said polycarbonate resin (B).

7. The polycarbonate composition of claim 6, comprising about 0.05 pbw to about 10 pbw of said polycarbonate resin (C).

8. The polycarbonate composition of claim 5, comprising about 84 pbw to about 92 pbw of said polycarbonate resin (A), and about 8 pbw to about 12 pbw of said polycarbonate resin (B).

9. The polycarbonate composition of claim 8, comprising about 0.1 pbw to about 4 pbw of said polycarbonate resin (C).

10. The polycarbonate composition of claim 1, comprising about 75 pbw to about 96 pbw of said polycarbonate resin (A), and about 4 pbw to about 15 pbw of said polycarbonate resin (B).

11. The polycarbonate composition of claim 10, comprising about 0.05 pbw to about 10 pbw of said polycarbonate resin (C).

12. The polycarbonate composition of claim 1, comprising about 84 pbw to about 92 pbw of said polycarbonate resin (A), and about 8 pbw to about 12 pbw of said polycarbonate resin (B).

13. The polycarbonate composition of claim 12, comprising about 0.1 pbw to about 4 pbw of said polycarbonate resin (C).

14. A data storage media comprising:
    a polycarbonate substrate comprising, based upon 100 pbw, about 50 to about 96 pbw of polycarbonate resin (A) having a weight average molecular weight of about 12,000 AMU to about 40,000 AMU, about 4 pbw to about 30 pbw of polycarbonate resin (B) having a weight average molecular weight of about 1,000 AMU to about 14,000 AMU; and about 0.05 to about 20 pbw of polycarbonate resin (C) having a weight average molecular weight of greater than about 23,000 AMU; wherein all molecular weights are determined by gel permeation chromatography using polycarbonate standards; and
    a data storage layer disposed on at least one side of said substrate.

15. The data storage media as in claim 14, further comprising a reflective layer disposed between said data storage layer and said substrate.

16. The data storage media as in claim 15, further comprising a protective layer disposed over said data storage layer on a side opposite said substrate.

17. The data storage media as in claim 16, further comprising a first dielectric layer disposed between the protective layer and the data storage layer, and a second dielectric layer disposed between the data storage layer and the reflective layer.

18. The data storage media as in claim 14, further comprising a reflective layer disposed on a side of the data storage layer opposite the substrate.

19. The data storage media as in claim 18, further comprising a protective layer disposed over said reflective layer, on a side opposite said data storage layer.

20. The data storage media as in claim 19, further comprising a first dielectric layer disposed between the reflective layer and the data storage layer, and a second dielectric layer disposed between the data storage layer and the substrate.

21. The data storage media as in claim 14, wherein the weight average molecular weight of said polycarbonate resin (A) is about 14,000 AMU to about 20,000 AMU, the weight average molecular weight of said polycarbonate resin (B) is about 5,000 AMU to about 10,000 AMU, and the weight average molecular weight of said polycarbonate resin (C) is about 23,000 AMU to about 125,000 AMU.

22. The data storage media as in claim 21, comprising about 75 pbw to about 96 pbw of said polycarbonate resin (A), and about 4 pbw to about 15 pbw of said polycarbonate resin (B).

23. The data storage media as in claim 22, comprising about 0.05 pbw to about 10 pbw of said polycarbonate resin (C).

24. The data storage media as in claim 21, comprising about 84 pbw to about 92 pbw of said polycarbonate resin (A), and about 8 pbw to about 12 pbw of said polycarbonate resin (B).

25. The data storage media as in claim 24, comprising about 0.1 pbw to about 4 pbw of said polycarbonate resin (C).

26. The data storage media as in claim 14, comprising about 75 pbw to about 96 pbw of said polycarbonate resin (A), and about 4 pbw to about 15 pbw of said polycarbonate resin (B).

27. The data storage media as in claim 26, comprising about 0.05 pbw to about 10 pbw of said polycarbonate resin (C).

28. The data storage media as in claim 14, comprising about 84 pbw to about 92 pbw of said polycarbonate resin (A), and about 8 pbw to about 12 pbw of said polycarbonate resin (B).

29. The data storage media as in claim 28, comprising about 0.1 pbw to about 4 pbw of said polycarbonate resin (C).

30. A polycarbonate composition based upon 100 pbw, comprising:
    about 84 to about 92 pbw of polycarbonate resin (A) having a weight average molecular weight of about 12,000 AMU to about 40,000 AMU; and
    about 8 pbw to about 12 pbw of polycarbonate resin (B) having a weight average molecular weight of about 1,000 AMU to about 14,000 AMU;
    wherein all molecular weights are determined by gel permeation chromatography using polycarbonate standards.

31. The polycarbonate composition of claim 30, wherein the weight average molecular weight of said polycarbonate resin (A) is about 14,000 AMU to about 20,000 AMU, and the weight average molecular weight of said polycarbonate resin (B) is about 5,000 AMU to about 10,000 AMU.

32. A data storage media comprising:
    a polycarbonate substrate comprising, based upon 100 pbw, about 84 to about 92 pbw of polycarbonate resin (A) having a weight average molecular weight of about 12,000 AMU to about 40,000 AMU, and about 8 pbw to about 12 pbw of polycarbonate resin (B) having a weight average molecular weight of about 1,000 AMU to about 14,000 AMU; wherein all molecular weights are determined by gel permeation chromatography using polycarbonate standards; and
    a data storage layer disposed on at least one side of said substrate.

33. The data storage media as in claim 32, further comprising a reflective layer disposed between said data storage layer and said substrate.

34. The data storage media as in claim 33, further comprising a protective layer disposed over said data storage layer on a side opposite said substrate.

35. The data storage media as in claim 34, further comprising a first dielectric layer disposed between the protective layer and the data storage layer, and a second dielectric layer disposed between the data storage layer and the reflective layer.

36. The data storage media as in claim 32, further comprising a reflective layer disposed on a side of the data storage layer opposite the substrate.

37. The data storage media as in claim 36, further comprising a protective layer disposed over said reflective layer, on a side opposite said data storage layer.

38. The data storage media as in claim 37, further comprising a first dielectric layer disposed between the reflective layer and the data storage layer, and a second dielectric layer disposed between the data storage layer and the substrate.

39. The data storage media as in claim 32, wherein the weight average molecular weight of said polycarbonate resin (A) is about 14,000 AMU to about 20,000 AMU, and the weight average molecular weight of said polycarbonate resin (B) is about 5,000 AMU to about 10,000 AMU.

* * * * *